Patented Nov. 1, 1938

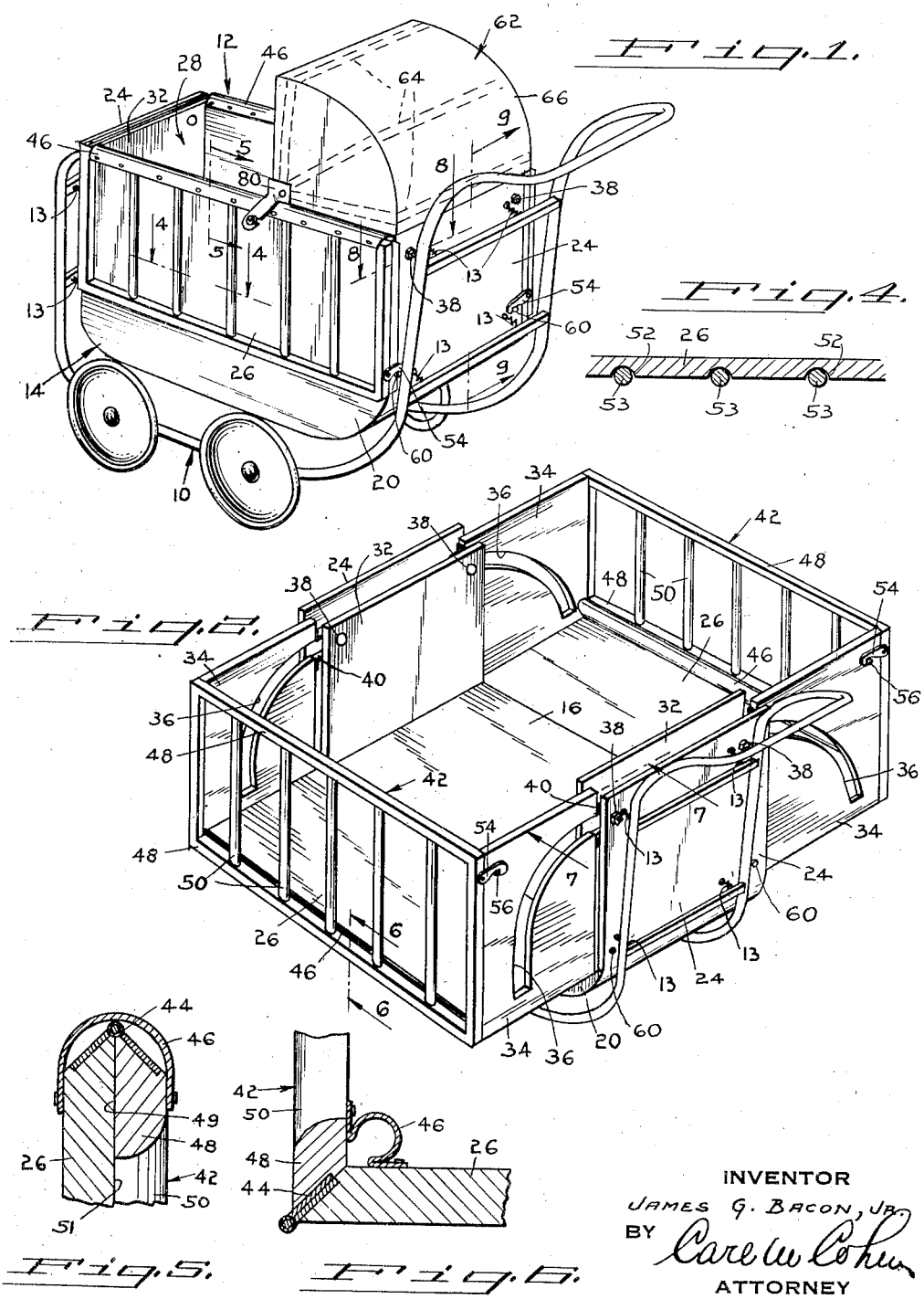

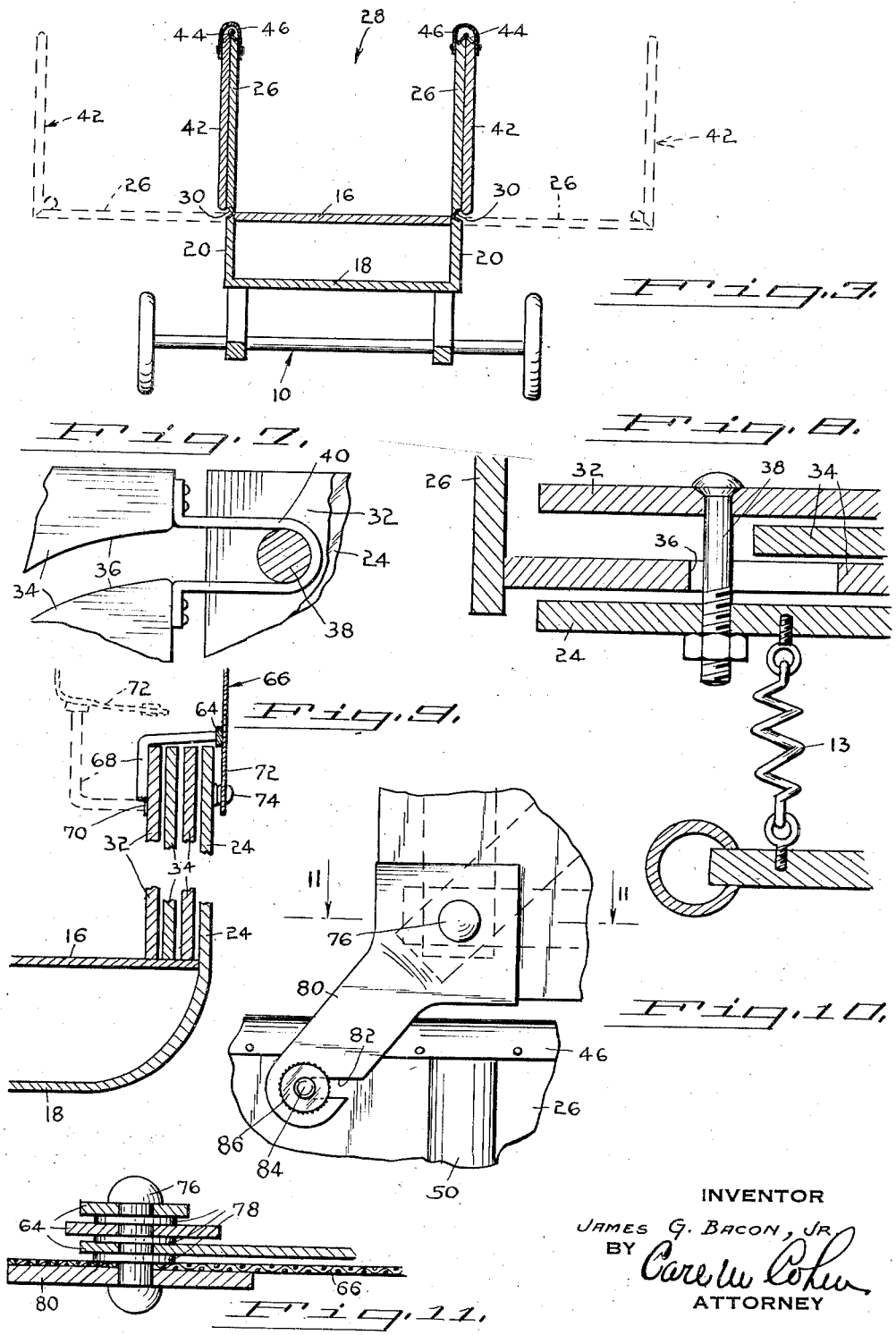

2,134,904

UNITED STATES PATENT OFFICE 2,134,904

COMBINATION BABY CARRIAGE OR CRIB AND PLAY-YARD

James G. Bacon, Jr., Bronx, N. Y., assignor to Augusta Slesinger, New York, N. Y.

Application June 28, 1937, Serial No. 150,708

8 Claims. (Cl. 280—30)

This invention relates to a combination baby carriage or crib and play-yard and has for its main object the provision of a convertible body structure which may be readily changed to adapt the same for use either as the body of the baby carriage or as a play-yard.

Another object of the invention is the provision of a body provided with foldable and extensible walls whereby to provide for enlarging the compartment in said body to make more room for the baby when the structure is used as a play-yard.

A further object is to provide the carriage with a hood which may be folded clear of the top of the body when the latter is used as a play-yard.

The above objects of the invention and other objects ancillary thereto will be fully understood from the following description considered with reference to the accompanying drawings.

In the drawings:

Fig. 1 is a perspective view of a combination baby carriage and play-yard embodying the present invention, showing the body of the carriage in folded condition;

Fig. 2 is a perspective view of the body in unfolded condition for use as a play-yard, the hood being omitted for the sake of clearness in illustration;

Fig. 3 is a transverse sectional view showing in dotted lines the extended position of the side walls of the carriage;

Fig. 4 is a detail sectional view on the line 4—4 of Fig. 1, showing a modification;

Fig. 5 is a detail sectional view on the line 5—5 of Fig. 1;

Fig. 6 is a sectional view on the line 6—6 of Fig. 2;

Fig. 7 is a sectional view on the line 7—7 of Fig. 2;

Fig. 8 is a sectional view on the line 8—8 of Fig. 1;

Fig. 9 is a sectional view on the line 9—9 of Fig. 1;

Fig. 10 is a fragmentary side view of the body showing the means for releasably holding the hood in position over the carriage body;

Fig. 11 is a sectional view on the line 11—11 of Fig. 10.

Referring now more particularly to the drawings, the combination baby carriage and play-yard embodying the present invention comprises a wheeled frame or chassis, indicated generally by the reference numeral 10, and a convertible body indicated generally by the reference numeral 12. Said body is supported in frame 10 by springs 13. If desired said body may be detached from the frame by disconnecting said springs from the body. Said body comprises a bottom 14 having spaced horizontal walls 16 and 18 and side walls 20. The ends of lower wall 18 are directed upwardly and are integral with or joined to front and rear outer end walls 24 which are disposed in upstanding relation to the bottom wall 16.

Side walls 26 which together with end walls 24 define the compartment 28 of the carriage are normally disposed in upstanding position in relation to bottom wall 16. Said side walls are pivotally mounted on bottom 14 and, more particularly, are secured by hinges 30 adjacent the upper edges of lower side walls 20 and the outer edges of bottom wall 16. Said side walls are thus movable from upstanding vertical position shown in full lines in Fig. 3 to extended horizontal position outwardly of bottom wall 16 forming continuations of the latter as shown in Fig. 2 and as indicated in dotted lines in Fig. 3. The adjacent edges of side walls 20 and 26 are preferably bevelled as shown.

Inner end walls 32 are secured in fixed upstanding relation to bottom wall 16 and in spaced relation to the adjacent outer end walls 24. A pair of supplementary end walls 34 is positioned between spaced end walls 24 and 32 at each end of body 12 and are swingable from retracted position between companion end walls 24 and 32 in parallel adjacent relation thereto outwardly of the latter to extended positions at opposite side edges thereof, that is, from the positions illustrated in Fig. 1 to the positions illustrated in Fig. 2. For this purpose said end walls are provided with arcuate slots 36 and each pair of end walls 24 and 32 is provided with pins 38 fastened to said walls and projecting through slots 36. A strap 40 is fixed to an inner edge of each supplementary end wall 34 for limiting the outward movement of said supplementary end wall. Each end wall 32 is fixedly connected to an edge of a side wall 26 and is movable with the latter.

Side closure members 42 are associated with side walls 26 and are hinged at the outer edges of the latter by piano hinges 44, the joints between said side walls and closure members being covered by a flexible strip 46 which extends for the full length thereof. Closure members 42, as here shown, comprise spaced longitudinal rails 48 and cross bars 50, and the arrangement is such that when said side walls 26 are in vertical upstanding position as illustrated in Fig. 1, closure members 42 lie closely adjacent said side walls. For this purpose the inner surfaces 49 and 51 of rails 48 and bars 50, respectively, are flat, or as illustrated in Fig. 4, bars 53 may be round and side walls 26 are provided with grooves 52 within which said round cross bars are received for providing the close positioning of companion side walls and closure members. Closure members 42 are movable from positions in which they are disposed in adjacent parallel relation to side walls 26 when the latter are in upstanding position to positions at the outer edges of said side walls in upstanding relation thereto when the latter are in extended horizontal position. Thus, as illustrated, side walls 26, supplementary end walls 34 and closure members 42 are movable from the position shown in Fig. 1 to the position shown in Fig. 2, and in the latter position provide a body of enlarged size to form the playyard from the carriage body illustrated in Fig. 1.

Closure members 42 are provided with pivoted latches 54 which engage pins 56 on supplementary end members 34 for releasably securing said closure members in vertical upstanding position. Said latches 54 on said closure members releasably engage pins 60 on end walls 24 for releasably securing said closure members and the companion side walls 26 in their upstanding positions in adjacent parallel relation to each other as illustrated in Fig. 1.

The carriage is preferably provided with a hood 62 pivotally and detachably supported at its lower forward covers upon the vertical side walls 26. Said hood comprises a foldable frame composed of a plurality of U-shaped bars 64 and a flexible cover 66 foldable with said frame. The lower rear edge of the hood is pivotally mounted at the upper end of rear end wall 32 by connecting the lowermost bar 64 of the frame to L-shaped brackets 68 which are pivotally connected to said inner end wall adjacent the upper edge thereof by hinges 70. A lower rear flap portion 72 of hood cover 66 is detachably connected to the outer side of rear end wall 24 by snap fasteners 74. The outer ends of frame bars 64 are connected by rivets 76, one at each side of the hood at the front end thereof, in pivotal engagement with the shanks of said rivets. Washers 78 are disposed between the ends of said bars on the rivet shanks for providing a frictional engagement therebetween so that said arms of the hood frame tend to remain in adjusted position. A hook 80 at each side of the carriage has one end thereof engaged with rivet 76 and has its other end provided with an open-ended slot 82 for releasable engagement with a pin 84 which projects from side walls 26 at the outer edge of the latter. A nut 86 screwed on to pin 84 serves to releasably secure hook 80 in engagement with pin 84. When body 12 is folded as illustrated in Fig. 1 for use as the body of the carriage, the hood is positioned as shown, being retained in said position by hooks 80, and while in said position, the hood may be folded back wholly or partially as desired. When the body is to be unfolded for use as a play-yard, hood flap 72 is disengaged from outer end wall 24 and hooks 80 are disengaged from their companion pins 84. When the hood is thus disengaged it may be moved forwardly so that the brackets 68 clear the tops of all the end walls at the rear of the carriage, as indicated in dotted lines in Fig. 9, thereby to permit the supplementary end walls 34 to be swung outwardly to their extended positions after which the hood may be disposed at the rear end of the body and folded into collapsed condition so as to substantially clear the top of the play-yard.

While I have shown and described the preferred embodiment of the invention it will be understood that the latter is capable of other embodiments and that certain changes in the construction and arrangements of parts may be made in the embodiment herein shown. Thus, for example instead of fixing the end walls 34 to side walls 12 and mounting the end walls for swinging movement, they may be detachably connected to said side walls and mounted for sliding movement between companion spaced walls 34 and 22 from retracted position between said spaced end walls to extended positions outwardly thereof, and other modifications of the construction shown herein will occur to those skilled in the art in view of the present disclosure. Also, while I have shown convertible body 12 supported on the frame of a baby carriage, it is within the scope of this invention to use said body in the frame of a bed or crib whether or not said frame is wheeled. Therefore, I do not wish to be limited precisely to the constructions herein shown or suggested, except as may be required by the appended claims considered with reference to the prior art.

Having thus described my invention, what I claim and desire to secure by Letters Patent is:

1. A convertible structure of the class described comprising a body having relatively movable end walls, a bottom, and side walls movable in relation to said bottom wall and certain of said end walls from a substantially vertical position to a substantially horizontal extended position, and side closure members movable in relation to said side walls from positions adjacent and parallel thereto, when the said side walls are in vertical position, to positions substantially at right angles to said side walls when the latter are in said horizontal extended position.

2. A convertible structure of the class described comprising a body having relatively movable end walls, a bottom, and side walls movable in relation to said bottom wall and certain of said end walls from a substantially vertical position to a substantially horizontal extended position, and side closure members movable in relation to said side walls from positions adjacent and parallel thereto, when the said side walls are in vertical position, to positions substantially at right angles to said side walls when the latter are in said horizontal extended position, said end walls being fixed to and movable with said side walls, and companion end walls fixed to said bottom and disposed between said movable end end walls when the latter are in extended position.

3. A convertible baby carriage and playyard comprising a wheeled frame, and a body supported by said frame comprising a bottom wall, end and side walls upstanding from said bottom wall, at least one of said side walls being movable from said upstanding position to a substantially horizontal extended position, and a side closure member associated with said movable side wall positioned in adjacent parallel relation thereto when the same is in said upstanding position and movable to a position at the outer edge of and in upstanding relation to said movable side wall when the latter is in horizontal position, and at least one of said end walls being extensible substantially to the outer edge of said movable side wall in the extended position of the latter.

4. A convertible baby carriage and play-yard comprising a wheeled frame, and a body supported by said frame comprising a bottom wall, end and side walls upstanding from said bottom wall, at least one of said side walls being movable from said upstanding position to a substantially horizontal extended position, and a side closure member associated with said movable side wall positioned in adjacent parallel relation thereto when the same is in said upstanding position and movable to a position at the outer edge of and in upstanding relation to said movable side wall when the latter is in horizontal position, and at least one of said end walls being extensible substantially to the outer edge of said movable side wall in the extended position of the latter, said extensible end wall being connected to said movable side wall for movement therewith.

5. A convertible baby carriage and play-yard comprising a wheeled frame, a body supported by said frame comprising a bottom, end walls upstanding from said bottom in fixed relation thereto, movable end walls associated with each of said fixed end walls swingable from retracted position in adjacent parallel relation therewith to an extended position outwardly at opposite ends of said end walls, side walls normally upstanding from said bottom wall and movable to substantially horizontal positions outwardly of said bottom wall forming continuations of the latter at opposite sides thereof, and side closure members associated with side walls in normally adjacent parallel relation thereto on the outer sides thereof, respectively, when the latter are in said upstanding position, and movable to positions upstanding from said side walls, when the latter are in said horizontal position, and means for releasably securing said movable walls and members in either of said positions thereof.

6. A convertible baby carriage and play-yard comprising a wheeled frame, a body supported by said frame comprising a bottom, end walls upstanding from said bottom in fixed relation thereto, movable end walls associated with each of said fixed end walls swingable from retracted position in adjacent parallel relation therewith to an extended position outwardly at opposite ends of said end walls, side walls normally upstanding from said bottom wall and movable to substantially horizontal positions outwardly of said bottom wall forming continuations of the latter at opposite sides thereof, and side closure members associated with side walls in normally adjacent parallel relation thereto on the outer sides thereof, respectively, when the latter are in said upstanding position, and movable to positions upstanding from said side walls, when the latter are in said horizontal position.

7. A convertible baby carriage and play-yard comprising a wheeled frame, a body supported by said frame comprising a bottom, end walls upstanding from said bottom in fixed relation thereto, movable end walls associated with each of said fixed end walls swingable from retracted position in adjacent parallel relation therewith to an extended position outwardly at opposite ends of said end walls, side walls normally upstanding from said bottom wall and movable to substantially horizontal positions outwardly of said bottom wall forming continuations of the latter at opposite sides thereof, and closure members associated with side walls in normally adjacent parallel relation thereto, when the latter are in said upstanding position, and movable to positions upstanding from said side walls, when the latter are in said horizontal position, said movable end walls being connected to said side walls for movement therewith to extended position.

8. A convertible baby carriage and play-yard comprising a wheeled frame, a body supported by said frame comprising a bottom, spaced end walls upstanding from said bottom adjacent each end thereof in fixed relation thereto, movable end walls associated with said fixed end walls at each end of said bottom swingable from retracted position between said spaced end walls to an extended position outwardly at opposite sides of said bottom, side walls normally upstanding from said bottom wall and movable to substantially horizontal positions outwardly of said bottom wall forming continuations of the latter at opposite sides thereof, and closure members associated with side walls in normally adjacent parallel relation thereto, when the latter are in said upstanding position, and movable to positions upstanding from said side walls, when the latter are in said horizontal position, said movable end walls being connected to said side walls for movement therewith to extended position, and means for releasably securing said movable walls and members in either of said positions thereof.

JAMES G. BACON, Jr.